Nov. 24, 1964    R. E. PUESTOW    3,157,916
LOCKING MECHANISM FOR COLLAPSIBLE BLEACHER
Filed May 18, 1960    6 Sheets-Sheet 1
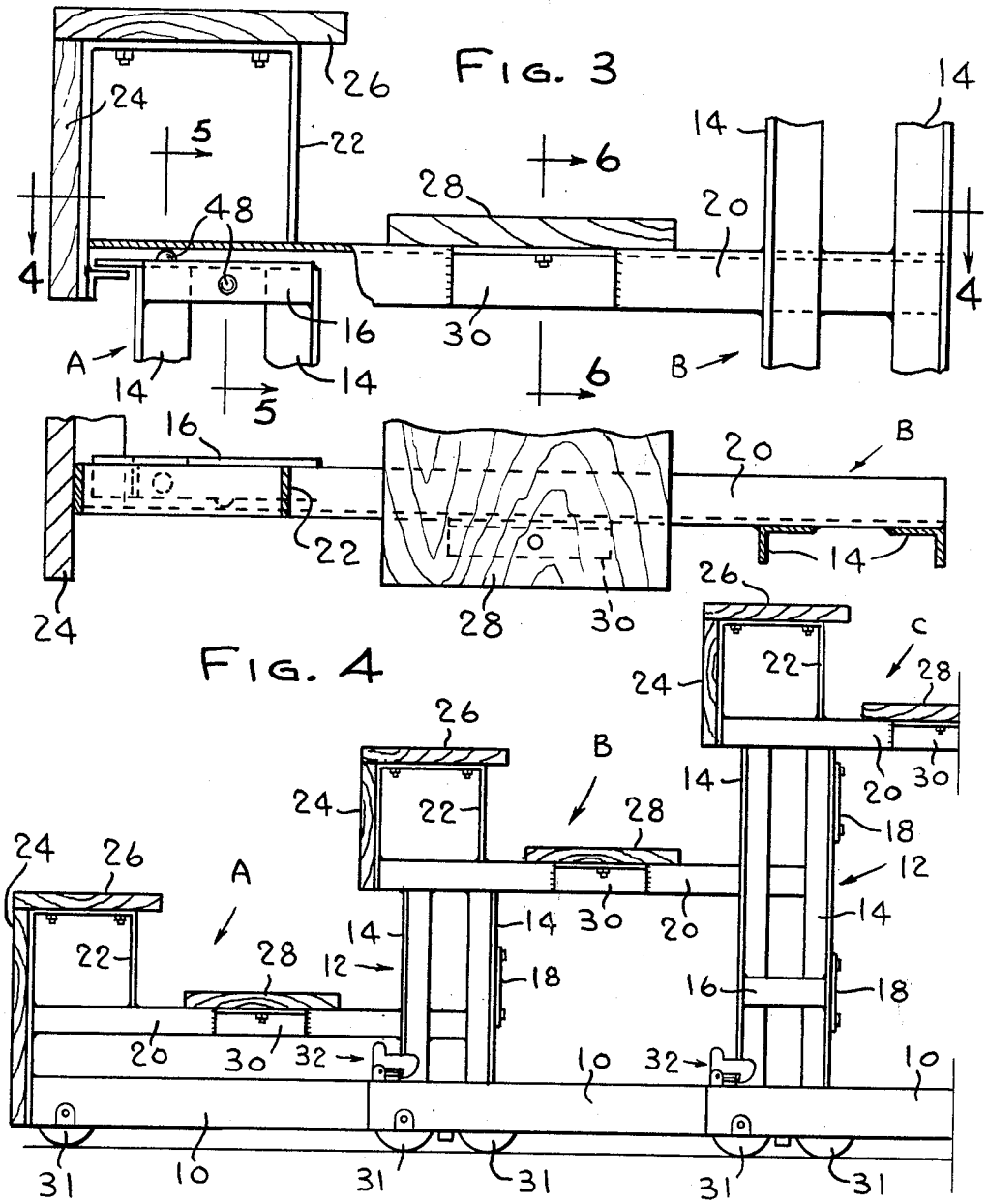
INVENTOR.
ROBERT E. PUESTOW
BY
John W. Michael
ATTORNEY

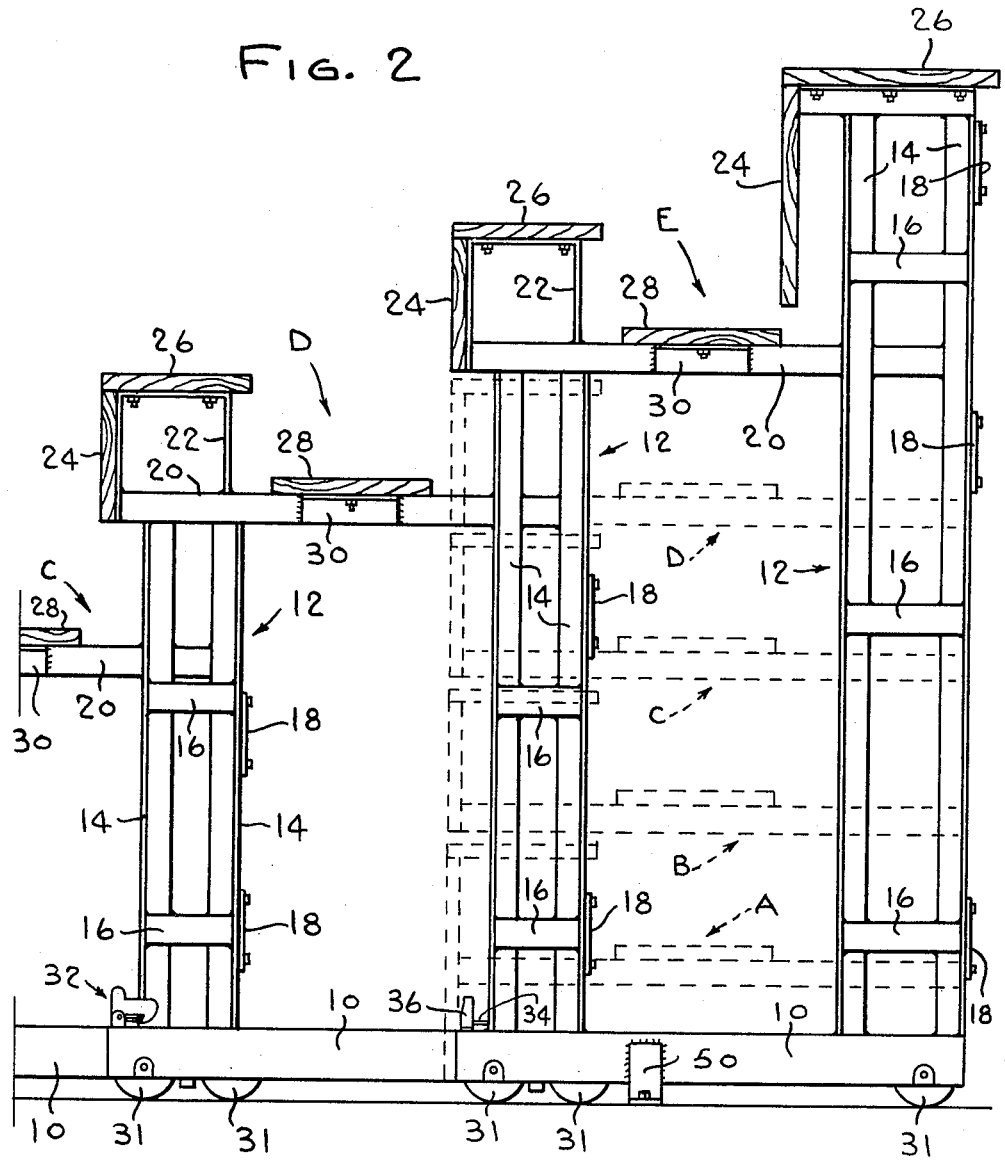

Nov. 24, 1964  R. E. PUESTOW  3,157,916
LOCKING MECHANISM FOR COLLAPSIBLE BLEACHER
Filed May 18, 1960  6 Sheets-Sheet 3
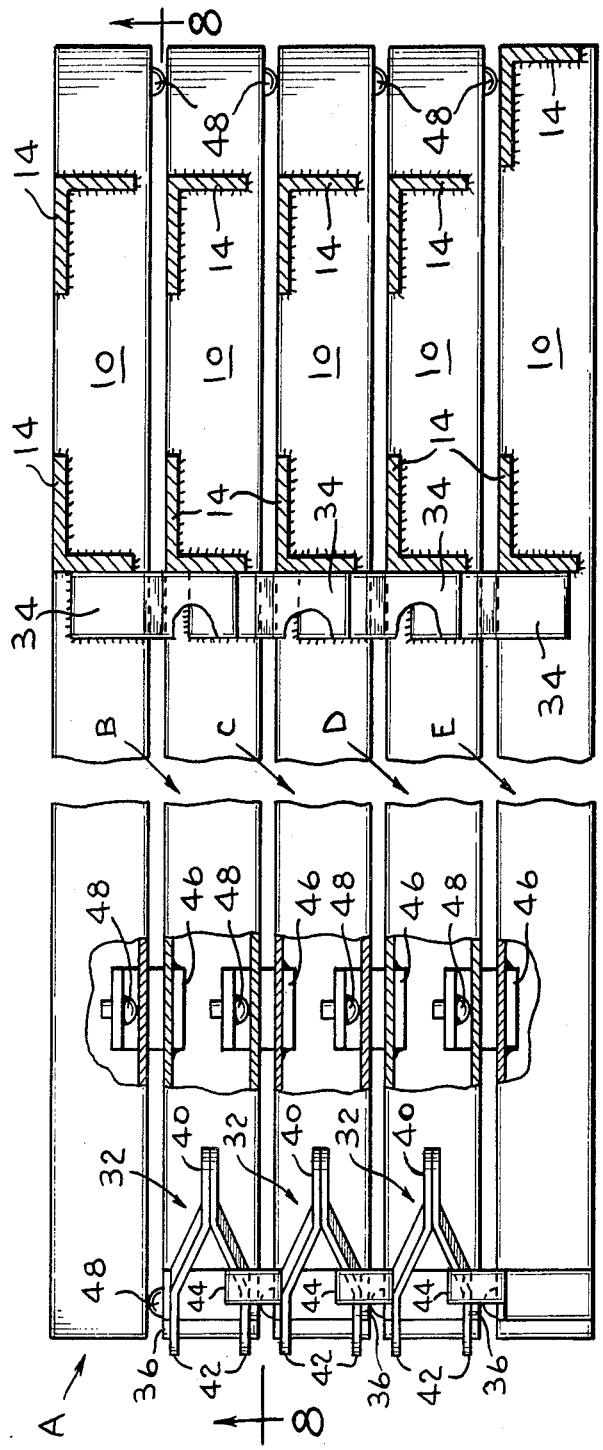
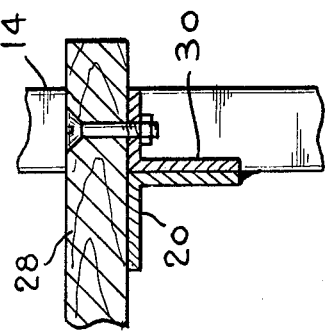
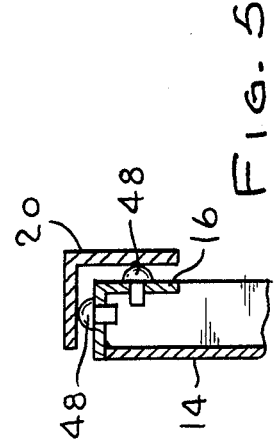
INVENTOR.
ROBERT E. PUESTOW
BY
John W. Michael
ATTORNEY

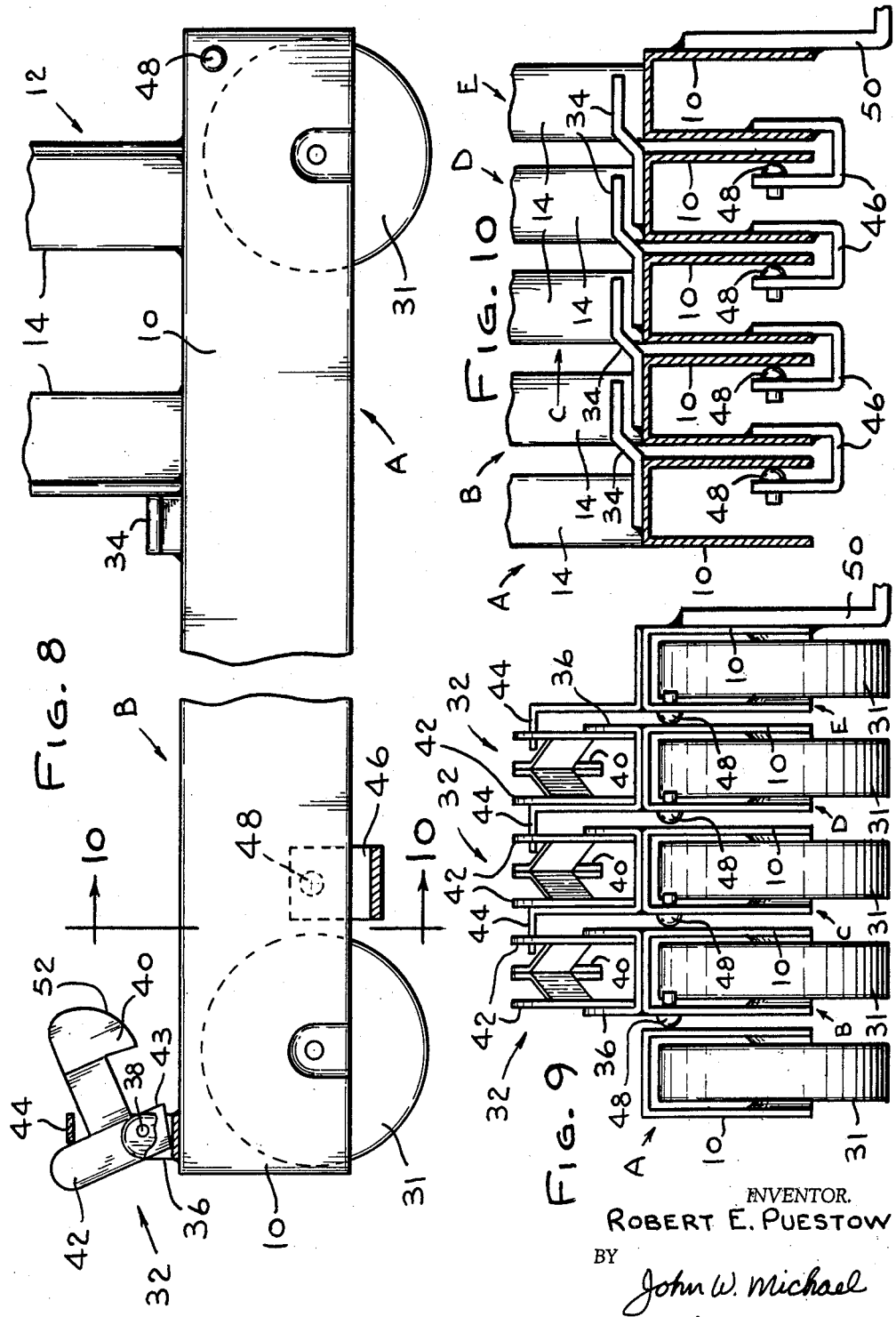

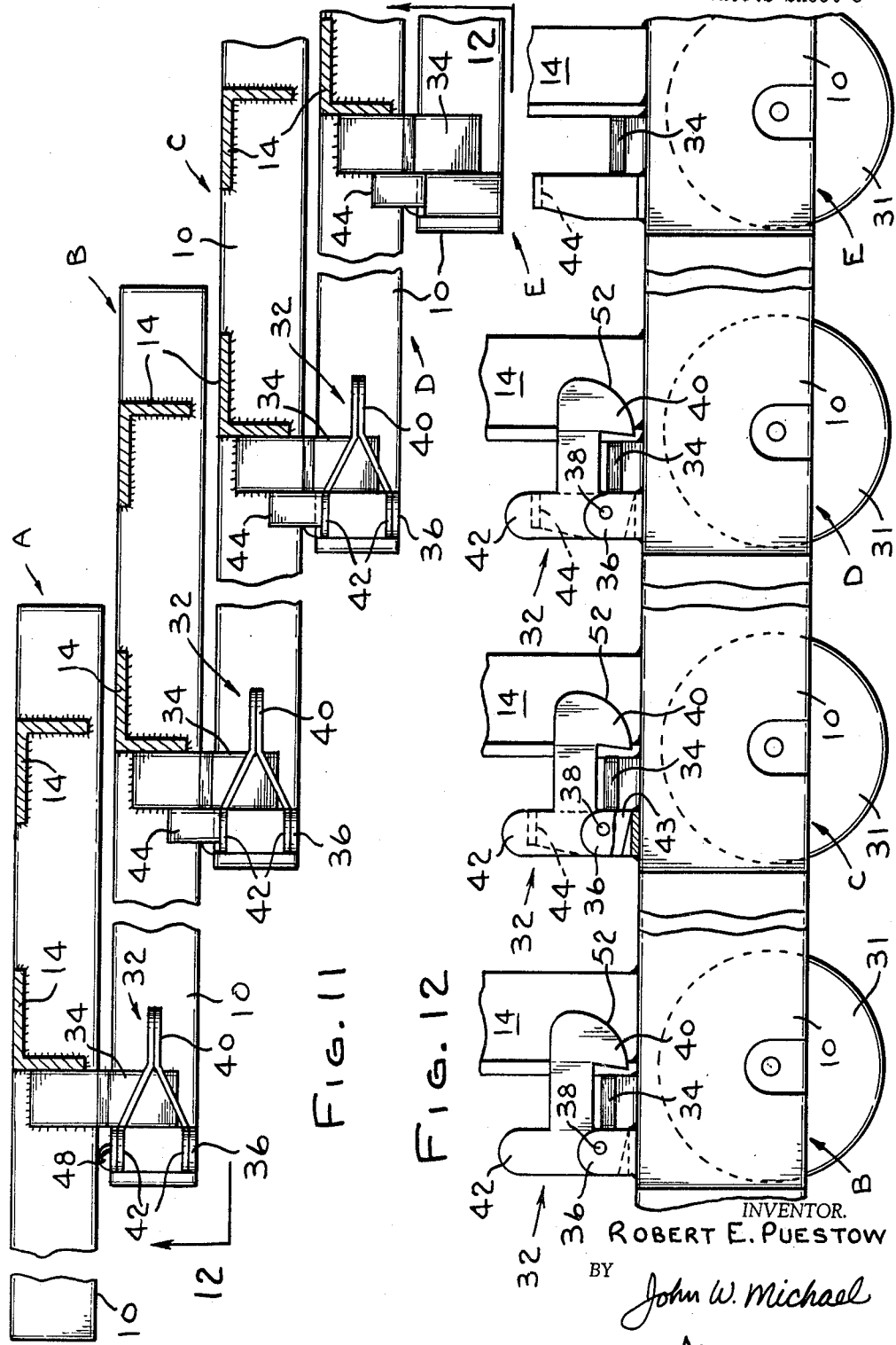

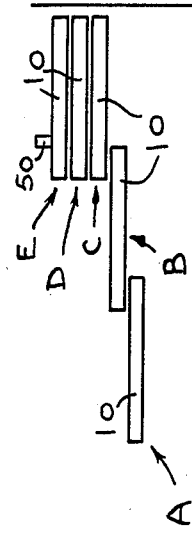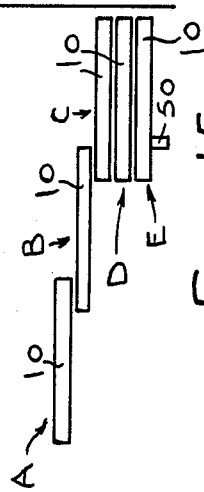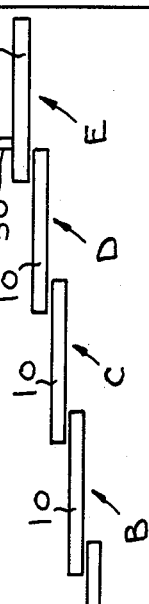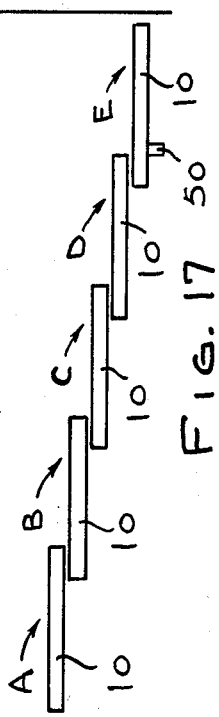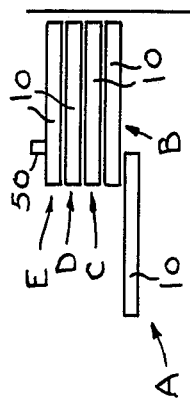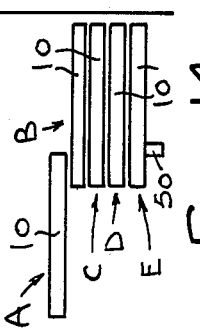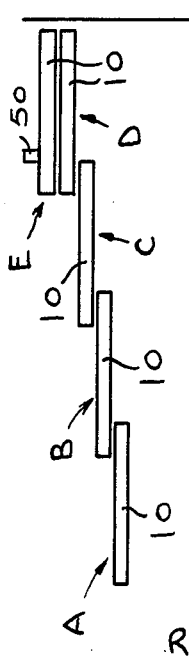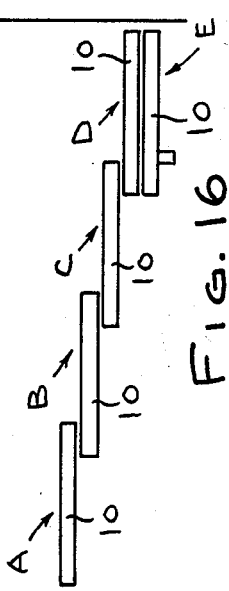

United States Patent Office 3,157,916
Patented Nov. 24, 1964

3,157,916
LOCKING MECHANISM FOR COLLAPSIBLE BLEACHER
Robert E. Puestow, Milwaukee, Wis., assignor to Safway Steel Products, Inc., Milwaukee, Wis., a corporation of Wisconsin
Filed May 18, 1960, Ser. No. 29,853
5 Claims. (Cl. 20—1.126)

This invention relates generally to retractable bleacher seats having a plurality of sections which can be telescoped one within the other for use in gymnasiums, auditoriums and the like, and more particularly to an improved row lock and trip mechanism for such seats.

It is desirable in bleacher seats of this type that the lower (front) sections are the first to be extended when opening and the higher (rear) sections are the first to retract when closing the structure. This arrangement is of particular significance when it is desired to partially extend the seats from a closed position or to partially retract the seats from an open position.

Prior structures providing the desired front to rear opening and rear to front closing operation have been subject to certain disadvantages. The major disadvantage has been the complexity of the automatic row lock and trip mechanism utilized between the sections to provide the desired sequence of operation. Such prior mechanism have not only been relatively costly to manufacture but have been difficult to install requiring custom on-the-job installation at the site.

It is the object of this invention, therefore, to provide bleacher seat structure having a relatively simple row lock and trip mechanism which can be mounted on the structural support members at the factory.

Another object is to provide a relatively smooth operating and reliable row lock and trip mechanism which provides extension of the sections from front to rear and retraction of the sections from rear to front.

Another object is to provide an improved row lock and trip mechanism, the operation of which will not be adversely affected to any great extent by unevenness in the floor on which the seat structure is installed.

This invention is embodied in a retractable seating structure having a plurality of movable seat sections adapted to nest one within the other when retracted. The objects of the invention are attained by an improved automatic row lock and trip mechanism which includes a lock bar mounted on a first section and a row lock pivotally mounted on a second section adjacent the first section. A lock closing means is provided to pivot the row lock member into engagement with the lock bar to successively lock adjacent sections together from front to rear as the seating structure is extended. Such lock closing means includes a locking nose on the row lock adapted for engagement by the lock bar to thereby pivot the row lock into locking engagement with the lock bar as the first section is extended.

A lock opening means is provided to actuate the row lock to successively unlock adjacent sections from rear to front as the seating structure is retracted. Such lock opening means includes a trip finger mounted on a third section adjacent the second section on which the row lock to be actuated is mounted. The trip finger is adapted to engage the row lock to thereby unlock the first and second sections as the second section reaches its fully retracted position. The first section is then free to nest within the second section as retraction continues. Additional sets of lock bars, row locks and trip fingers are provided as necessary as the number of seat sections is increased.

Although but a single embodiment of the present invention has been illustrated and described, it will be apparent to those skilled in the art that various changes and modifications may be made therein without departing from the spirit of the invention or from the scope of the appended claims.

FIGS. 1 and 2, when taken together, represent a side elevation view of the bleacher seat structure embodying this invention in its extended position;

FIG. 3 is a fragmentary side elevation view of the seat structure showing certain details of the seat angle and column construction;

FIGS. 4, 5 and 6 are fragmentary sectional views taken along lines 4—4, 5—5 and 6—6 of FIG. 3, respectively;

FIG. 7 is a fragmentary plan view (with parts broken away) of the carriage assembly structure with the sections in retracted position;

FIG. 8 is a fragmentary sectional view taken along line 8—8 of FIG. 7;

FIG. 9 is an end elevation view of the structure shown in FIG. 7;

FIG. 10 is a sectional view taken along line 10—10 of FIG. 8;

FIG. 11 is a view similar to FIG. 7 but showing the sections in extended position;

FIG. 12 is a fragmentary side elevation view taken along line 12—12 of FIG. 11; and FIGS. 13–17 are partially schematic views of the bleacher seat carriage structure in its various stages of extension from the fully retracted position to the fully extended position.

Referring to the drawings in detail, FIGS. 1 and 2, when taken together, show one complete gym seat assembly in its extended position for supporting spectators. The position of the structure in retracted position is shown in dotted lines in FIG. 2. The structure includes a plurality of sections identified on the drawings by letters A, B, C, D and E. While only five sections are included in the embodiment of the invention shown in the drawings and described hereinafter, it should be understood that in most installations more than five sections are employed. Similarly, while only a single assembly of telescoping sections is shown, a typical installation will generally include a number of such assembies arranged side by side along the walls of a gymnasium for example.

The various sections of the assembly are of similar construction with each successive section being of a different height so that they will nest together when retracted. Each section includes a pair of spaced horizontal carriage members 10 adapted to assume the various positions shown in the schematic plan views (FIGS. 13–17). As shown in FIGS. 1 and 2, each carriage member 10 has a vertical column assembly 12 comprising a pair of spaced angles 14, 14 fastened to the channels and reinforced by web angles 16. The pairs of carriage members 10 are interconnected to provide a self-supporting structure by back braces 18 bolted to the rear angles 14 of each section. To each column 12 is fastened a horizontal seat angle 20 extending forwardly from the columns and parallel to carriage members 10 at the desired height depending on the particular section involved. Angles 20 have seat irons 22 fastened thereto for mounting riser and seat boards 24 and 26, respectively, at the forward ends of the angles. Foot boards 28 are also mounted on angles 20 between the seats and vertical columns of each section by means of brackets 30.

Each section of the gym seat assembly is supported for extending and retracting rolling movement by two pairs of wheels 31 mounted between the legs of the channel shaped carriage members 10 as clearly shown in FIG. 9.

As shown in FIG. 17, each pair of carriage members for sections A–E are spaced so that each successive section going from front to rear fits inside the next section. Similarly, as shown in FIGS. 1 and 2, the seat height of each successive section going from rear to front decreases so that as each section is rolled rearwardly it will nest underneath and between its next adjacent section to the rear.

FIG. 3 shows how the seat angle 20 of one section is supported on the top of a column 12 of the next adjacent section to the front when the sections are extended for use. Thus, if it is assumed for example that the seat angle 20 shown in FIG. 3 is for section B, the column 12 positioned under the end of the angle to support it is that of section A.

As previously stated, when retracting the extended seat structure it is desirable that the sections telescope from the rear while the rest of the sections remain locked in extended positions. Assume, for example, that with the seat assembly fully extended as shown in FIGS. 1 and 2 (shown schematically in FIG. 17) that it is desired to retract the structure to the position shown in FIG. 15 wherein only the seats of sections A, B and C are usable.

The new and improved automatic row lock and trip mechanism which provides the desired sequence of operations includes a row lock member 32 pivotally mounted on each carriage member 10 and adapted for locking engagement with a lock bar 34 mounted on each carriage member to the rear of the row lock by welding or other suitable means. Row locks 32 are mounted on the webs of channel members 10 by means of U-shaped brackets 36 welded or otherwise secured to the channels. Row locks 32 are pivotally mounted between the upstanding legs of brackets 36 by pins 38 for pivotal movement back and forth between a locked position (FIGS. 11 and 12) and a tripped position (FIGS. 7, 8 and 9). The row locks are of two-piece construction having a locking finger 40 adapted for locking engagement with a lock bar 34, a trip nose 42 adapted for contact with a stationary trip finger 44 formed on each bracket 36 as the seats are retracted, and a locking nose 43 adapted for contact with a lock bar 34 as the seats are extended. Fingers 44 are adapted to pivot the row locks from the locked to the tripped position at the proper time as will presently be explained.

As shown clearly in FIG. 10 each carriage member is equipped with a U-shaped carriage keeper 46 adapted to retain the parts in adjacent position to insure proper relative sliding movement of the sections. Any suitable means such as rivets 48 may be provided on keepers 46 (FIG. 10), carriage members 10 (FIG. 9) and the upper web angles 16 (FIGS. 3 and 5) to maintain the proper spacing and reduce friction between the parts.

The above described mechanism operates as follows. With the seat structure in its fully extended position (FIGS. 1, 2 and 17) the automatic locking and trip mechanism will be positioned as shown in FIGS. 11 and 12. In this position lock bars 34 on the section A carriage members will be engaged by locking fingers 40 of row locks 32 on the section B carriage members, lock bars 34 on the section B carriage members will be engaged by locking fingers 40 of row locks 32 on the section C carriage members, and so on rearwardly except that no row lock is provided on the rear-most stationary section E to lock such section to its adjacent sliding section D. Section E, however, is provided with trip fingers 44 as shown in FIGS. 11 and 12. Section E, it is noted, is held stationary by any suitable means such as brackets 50 welded to the carriage members of the section and fastened to the floor as shown in FIG. 2. Thus, it is seen that in the fully extended position section A is locked to section B, section B is locked to section C, etc. by the cooperation of lock bars 34 and row locks 32 on the respective sections.

To retract the seats, the operator pushes on the front section A. Since sections A, B, C and D are locked together they will be moved as a unit as section D nests into stationary section E to the position shown in FIG. 16. As section D approaches its fully nested position within section E, the trip fingers 44 on carriage members 10 of section E will contact trip noses 42 of the row locks on the section D carriage members causing such row locks to be tripped and thereby release locking bars 34 on the section C carriage members. It should be noted at this point that as row locks 32 are tripped by fingers 44 the locks 32 are pivoted upwardly and forwardly in a direction opposite that in which locking bars 34 are moving. This insures proper disengagement of the row locks from the locking bars to provide smooth, uninterrupted movement of the various sections as they are retracted. Jamming of the mechanism has been virtually eliminated. With sections C and D thus unlocked from each other, section C is free to move with respect to section D as retraction continues with sections A and B and B and C still locked together. Continued retraction will cause row locks 32 on sections C, B and A to be tripped in that sequence until the seats are fully retracted (FIGS. 7 and 13).

From the above description it is seen that as the structure is retracted, the sections will telescope from the rear with the front sections remaining locked to each other until each successive section reaches the positions occupied by sections D, C, B and A in FIGS. 17, 16, 15 and 14, respectively. This operation, as explained previously, is preferred particularly when, for example, it is desired to partially retract the seats from the position shown in FIG. 17 to that shown in FIG. 15.

To extend the seats the operator merely pulls on section A causing the various sections to move through the successive positions shown in FIGS. 13 to 17. Starting with the sections in fully retracted positions as shown in FIG. 7, carriage section A will be rolled out until lock bars 34 thereon engage locking noses 43 of row locks 32 on the section B carriage members causing locking fingers 40 to be pivoted downwardly and thereby lock the two sections together. The rear edges of locking fingers 40 are provided with a curved camming surface 52 as clearly shown in FIG. 8. Thus, if for any reason a row lock drops to locked position before the adjacent lock bar 34 moves underneath it, cam surface 52 will allow the bar to pivot the row lock back up and move smoothly into locking engagement therewith. Continued extension will cause section B to roll out until it becomes locked to section C and this sequence of operation continues until the seats are fully extended (FIG. 11).

In the fully extended position or in any intermediate position the seat structure can be held against accidental movement in either direction by means of a suitable brake (not shown) mounted on the front section A and adapted when set to engage the floor and hold the section stationary.

It should be noted that although locking noses 43 on row lock 32 are not absolutely essential to the locking operation (row locks could drop by gravity), such locking noses do perform two important functions. First, they provide a positive locking action to prevent the row locks from sticking in open position. Second, they prevent or at least make it difficult to manually unlock the sections manually when the seats are extended. Unauthorized tampering with the mechanism by children, for example, is substantially reduced. It is also noted that each row lock 32 is actuated by a trip finger 44 and a locking bar 34 on the immediately adjacent seat sections and thus any unevenness in the floor will result in only a minimum amount of misalignment between the cooperating parts of the mechanism.

Although but one embodiment of the present invention has been illustrated and described, it will be apparent to those skilled in the art that various changes and modifications may be made therein without departing from the spirit of the invention or from the scope of the appended claims.

I claim:

1. A row lock and trip mechanism for a retractable seating structure having a plurality of movable seat sections adapted to nest one within the other when retracted comprising, a lock bar member mounted on a first section, a row lock member pivotally mounted on a second section adjacent said first section, said row lock member adapted for engagement with said lock bar member to lock the first and second sections together, and a trip finger mounted on a third section adjacent said second section, said trip finger adapted to engage said row lock member to thereby unlock said first section from said second section as said seat structure is retracted, said row lock member having a trip nose and a locking nose thereon, said trip nose located a short distance directly above the pivot point of said row lock member and adapted for engagement by said trip finger to pivot said row lock member in one direction and unlock said first and second sections as said seat structure is retracted, said locking nose adapted for engagement by said lock bar member to thereby pivot said row lock in the other direction and lock said first and second sections together as said seat structure is extended.

2. A row lock and trip mechanism according to claim 1 in which said trip finger is made a part of a row lock member mounted on said third section.

3. A retractable seating structure comprising a plurality of movable seat sections adapted to nest one within the other when retracted, locking means for locking adjacent sections together, said locking means including a lock bar member mounted on a first section and a row lock member pivotally mounted on a second section adjacent said first section, said row lock member adapted for engagement with said lock bar member to lock the two sections together, lock closing means adapted to engage and positively actuate said locking means to successively lock adjacent sections together from front to rear as the seating structure is extended, said lock closing means including a locking nose on said row lock member adapted for engagement by said lock bar member to thereby pivot said row lock and lock the first and second sections together as said seat structure is extended, and lock opening means adapted to actuate said locking means to successively unlock adjacent sections from rear to front as said seating structure is retracted, said lock opening means including a trip finger mounted on a third section adjacent said second section, said trip finger adapted to engage said row lock member and unlock said first section from said second section as said seat structure is retracted.

4. A row lock and trip mechanism for a retractable seating structure having a plurality of movable seat sections adapted to nest one within the other when retracted comprising locking means for locking successive sections together, said locking means including a lock bar member mounted on a first section and a row lock member pivotally mounted on a second section adjacent said first section, said row lock member adapted for engagement with said lock bar member to lock the two sections together, lock closing means adapted to actuate said locking means to successively lock adjacent sections together from front to rear as the seating structure is extended, said lock closing means including a locking nose on said row lock member adapted for engagement by said lock bar member to thereby pivot said row lock in one direction to lock said first and second sections together as said seat structure is extended, and lock opening means adapted to actuate said locking means to successively unlock adjacent sections from rear to front as said seating structure is retracted, said lock opening means including a trip nose on said row lock member, and a trip finger mounted on a third section adjacent said second section, said trip finger adapted to engage said trip nose on the row lock member to thereby pivot the said row lock member in the other direction and unlock said first section from said second section as said seat structure is retracted.

5. A row lock and trip mechanism for a retractable seating structure having a plurality of movable seat sections adapted to nest one within the other when retracted comprising a lock bar member mounted on a first section, a row lock member pivotally mounted on a second section adjacent said first section, said row lock member adapted for engagement with said lock bar member to lock the first and second sections together, and a trip finger mounted on a third section adjacent said second section, said trip finger adapted to engage said row lock member to thereby unlock said first section from said second section as said seat structure is retracted, said row lock member having a trip nose and a locking nose thereon, said trip nose adapted for engagement by said trip finger to pivot said row lock member in one direction and unlock said first and second sections as said seat structure is retracted, said locking nose adapted for engagement by said lock bar member to thereby pivot said row lock in the other direction and lock said first and second sections together as said seat structure is extended.

References Cited in the file of this patent

Safway Spectator Seating, Catalogue No. GS–657, by Safway Steel Products, Inc., Milwaukee 13, Wis.